Dec. 26, 1939.   F. SCHOLZ   2,184,962
X-RAY APPARATUS
Filed Feb. 8, 1938   2 Sheets-Sheet 2
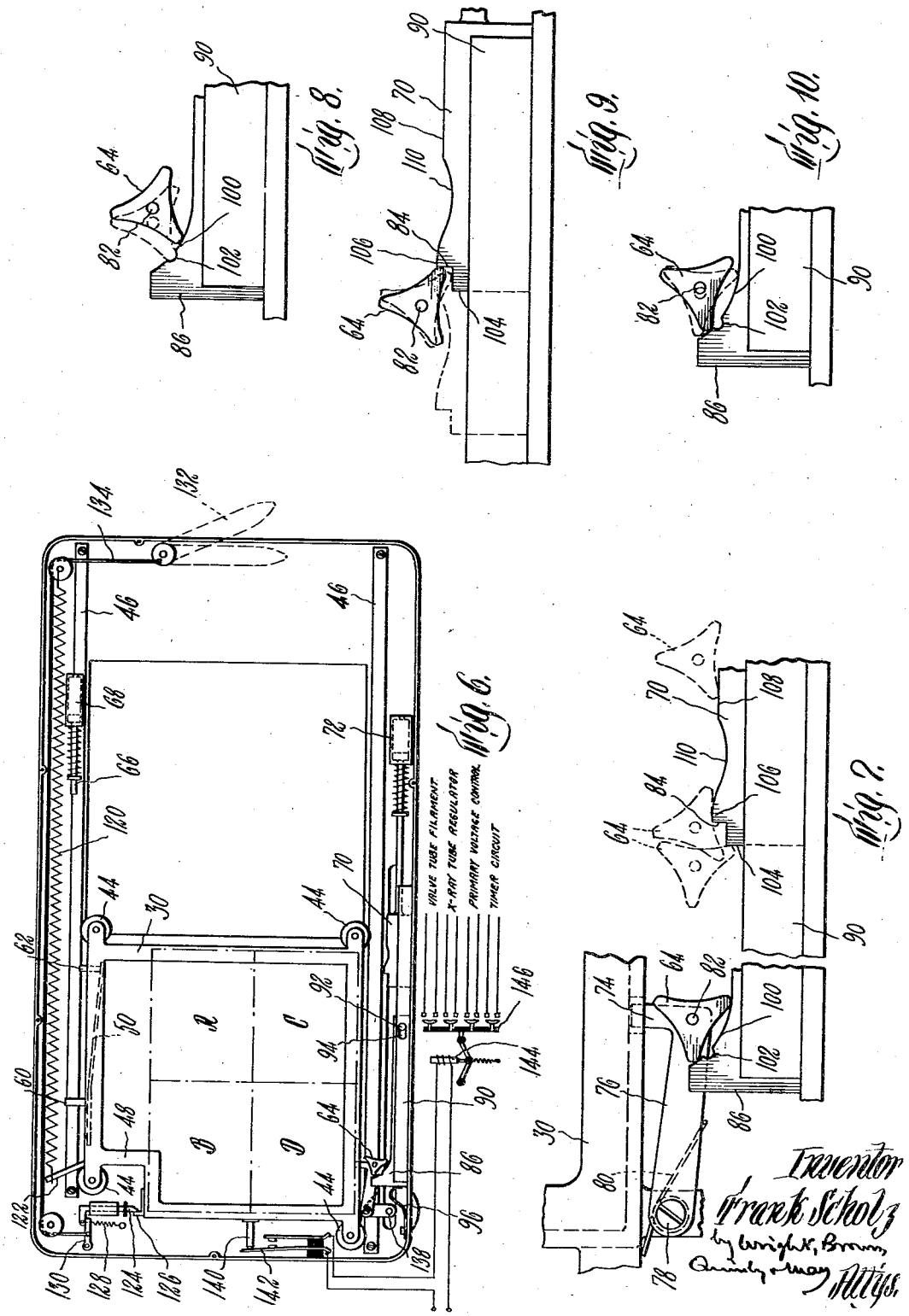

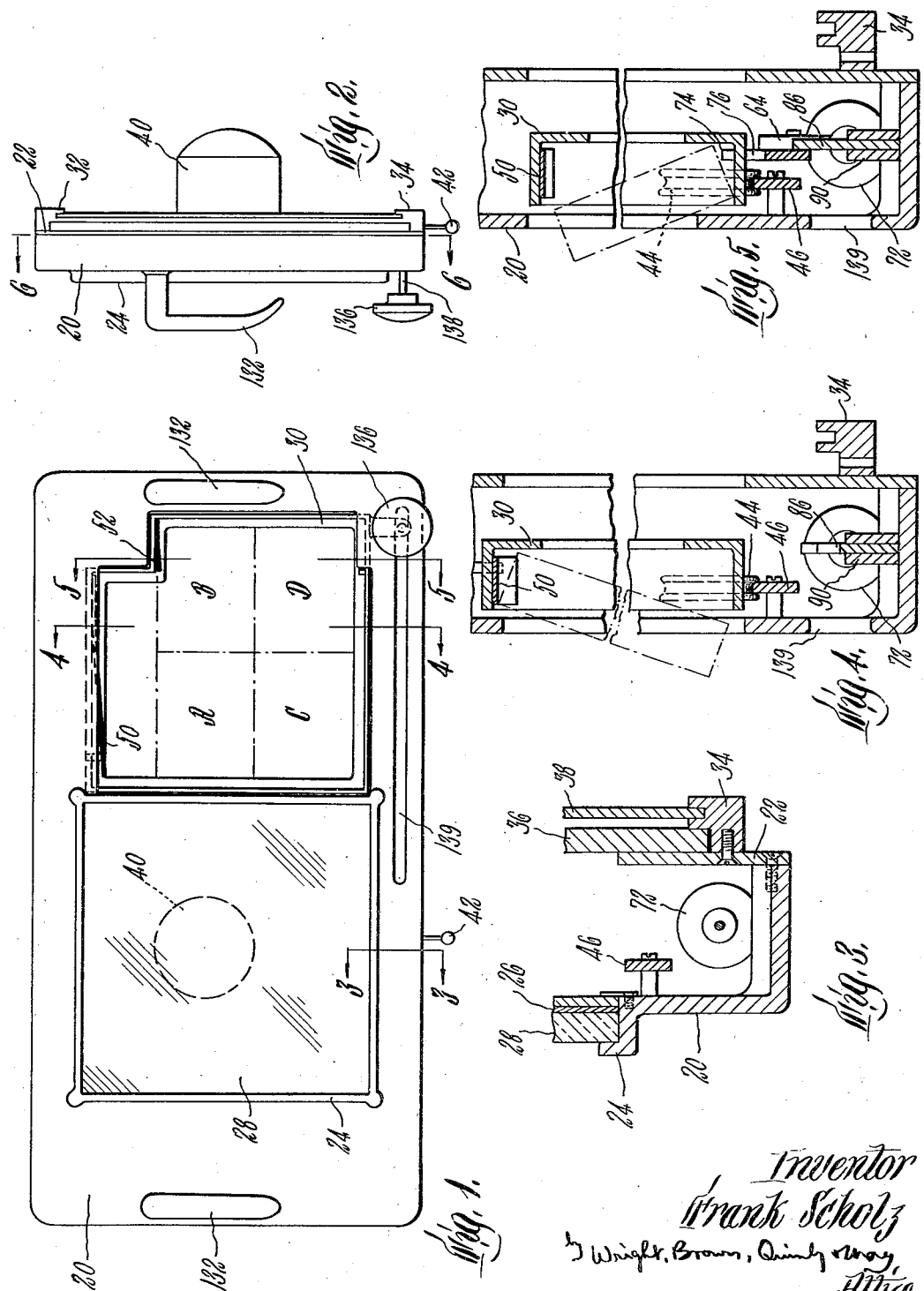

Patented Dec. 26, 1939

2,184,962

UNITED STATES PATENT OFFICE 2,184,962

X-RAY APPARATUS

Frank Scholz, Cambridge, Mass.

Application February 8, 1938, Serial No. 189,377

7 Claims. (Cl. 250—66)

This invention relates to apparatus employed in X-ray examinations, and more particularly to apparatus carrying photographic films and various screens which are customarily employed in fluoroscopic and radiographic operations.

In making X-ray photographs for diagnostic purposes, it is often important to make the exposures at just the right moments to show on photographic films stages in the movements of the objects being examined. To this end, the practice is to view the object or part through a fluoroscopic screen until the object is in correct condition and position for a photograph, and then to make an exposure as soon as thereafter as possible. This involves moving the photographic film into position for exposure and stepping up the intensity of radiation so as to make a quick impression on the film. In some cases it is desirable to make one large image on the film and in other cases it is desirable to make a number of smaller images on the film. In either case, it is important to move the cassette, which holds the film, quickly and accurately into the proper position for exposure of the film. According to the present invention, the apparatus is provided with mechanism for moving the cassette from its idle position and automatically stopping it in the proper position for exposure of the film. The apparatus also includes a Bucky grid and a compression cone slidably mounted for movement into and out of registration with the fluorescent screen.

When the radiation is stepped up from an intensity suitable for fluoroscopic examination to an intensity suitable for photographic purposes, an appreciable interval of time, i. e., a substantial fraction of a second, is required to heat up the filaments for increased electron emission. My improved apparatus is constructed so that this build-up occurs during the travel of the cassette from its idle position to any of its positions for exposure, so that, when the cassette is in position, the customary foot-switch can be closed at once to close the circuit to the X-ray tube.

For a more complete understanding of the invention, reference may be had to the following description of an illustrative embodiment thereof, and to the drawings of which Figure 1 is a front elevation of apparatus embodying the invention.

Figure 2 is an end elevation of the same.

Figure 3 is a fragmentary section on the line 3—3 of Figure 1.

Figure 4 is a section on the line 4—4 of Figure 1.

Figure 5 is a section on the line 5—5 of Figure 1.

Figure 6 is a rear elevation of the apparatus shown in Figure 1, the back plate being removed, this view being taken on the line 6—6 of Figure 2.

Figure 7 is a fragmentary elevation of parts of the apparatus shown in Figure 6.

Figures 8, 9 and 10 are fragmentary elevational views of the same in different positions of operation.

The apparatus shown in Figures 1 and 2 comprises a rectangular frame 20 having a rear cover or wall 22, the frame and cover resembling a shallow box or housing as indicated in Figures 3, 4 and 5. The frame 20 is provided with a rectangular opening surrounded by a flange 24 in which is mounted a fluorescent screen 26 and a lead glass plate 28. This opening is offset to the left of the center line of the frame when viewed as shown in Figure 1. To the right of this opening is a second opening in the frame 20, the latter opening being for the insertion of a cassette in a cassette holder 30 which is removably mounted within the box formed by the frame 20 and the back plate 22.

The back plate 22 is provided with a pair of double channel members 32 and 34 which slidably support a pair of screens, namely, a Bucky grid 36 and a compression cone 38, the latter having the usual projection 40. The Bucky grid is supplied with an operating handle 42 by which it can readily be shifted from an active position in registry with the fluorescent screen 26 to an inactive position to the right of the screen 26 as viewed in Figure 1. The Bucky grid and compression cone are thus always within easy reach and are not liable to be mislaid in the darkness in which operations are usually carried on. As indicated in Figure 6, the cassette holder 30 is a carriage having rollers 44 riding on a pair of parallel rails 46 between the front and rear walls of the frame. The cassette itself is oblong in shape to hold a film of standard size and shape, and may be inserted into the cassette holder 30 in either a horizontal or a vertical position. The cassette holder 30 is formed with a reentrant corner 48 so that there is only one vertical position and one horizontal position possible for the cassette, the horizontal position being indicated in broken lines in Figures 1 and 6. When the cassette is inserted in its vertical position, its upper edge bears against a spring 50 which serves to hold the cassette in place in the holder 30 and to prevent its falling out. In like manner, a spring 52 is provided to bear against the upper edge of the cassette when inserted in its horizontal position.

In making photographic X-ray pictures, it is sometimes desirable to make a single large picture covering the entire film in the cassette. On the other hand, it is sometimes desirable to make smaller pictures such that four of them may be made on a single film. When a single large picture is to be taken, the cassette is inserted in the holder 30 in its vertical position and the holder is moved into an active position wherein it is centered with respect to the fluorescent screen 26. When smaller pictures are desired, the cassette is inserted in its horizontal position and the compression cone 38 is moved into active position so as to shield the film in the cassette except where the rays enter through the projection 40. Thus the cassette must be positioned so that different portions thereof are successively in registry with the projection 40. The projection 40 is at such an elevation as to be horizontally alined with the upper half of the cassette when the latter is in its horizontal position. The cassette can thus be made to occupy two successive positions for pictures on areas of the film indicated at A and B. The cassette is then removed from the holder and reversed so that the areas C and D are uppermost. The holder is then moved into two successive positions wherein the areas C and D register with the projection 40 of the compression cone.

According to the present invention, apparatus is provided for automatically stopping the cassette holder at the proper one of its three active positions as it is moved back and forth between these positions and the idle position illustrated in Figures 1 and 6, these three active positions including a mean active position where the cassette holder is stopped when the cassette is in its vertical position, the other two positions being extreme active positions to the right and left of this mean position for exposures of portions A, B, C and D of the film in the cassette. Apparatus for automatically stopping the cassette holder at the correct active position is illustrated in Figures 6 to 10. As therein shown, three stop elements are shown for limiting the movements of the cassette holder from its idle position to its active positions, these elements being indicated at 60, 62 and 64. The stop elements 60 and 62 cooperate with an abutment element 66 connected to the dash-pot element 68 so that the termination of travel of the cassette holder is cushioned. The stop element 60 stops the holder in its furthermost active position from the idle position and is effective only when the holder is not sooner stopped by the elements 62 or 64. Cooperating with the stop element 64 is an abutment member 70 connected to a dash-pot 72 to cushion the stopping of the cassette holder. As is hereinafter explained, the stop element 62 is inoperative unless the cassette is in its vertical position in the holder 30. In like manner, the stop element 64 is inoperative unless the cassette is in its horizontal position in the cassette holder. To this end, the stop element 62 is mounted on the leaf spring 50 and projects through a hole in the upper portion of the cassette holder 30. When the cassette is inserted in the holder in its vertical position, the element 62 is moved upward so that it is in position to engage the abutment element 66. These elements are so located that when the element 62 is operated it stops the holder in its mean active position wherein the cassette is centered with respect to the fluorescent screen.

When the cassette is inserted in the holder 30 in its horizontal position, the lower edge of the cassette presses against the end 74 of a lever 76 which is pivoted at 78 and rocks the lever against a spring 80 to the position indicated in Figures 6 and 7. The lever 76 carries the stop element 64 which is in the form of a triangular pawl and is centrally pivoted as at 82 on the lever 76. As indicated in Figures 7, 8, 9 and 10, the pawl 64 is adapted to assume different angular positions so that it can either engage a shoulder 84 on the abutment member 70 so as to stop the cassette when the portion A thereof is in active position, or may pass by the shoulder 84 in which case the cassette holder is stopped by the engagement of the element 60 with the abutment member 66 when the area B of the cassette is in active position. The pawl 64 cooperates with the abutment member 70 which acts as a cam as well as an abutment, and also with a second cam member 86 to turn the pawl 64, so that, when the cassette holder 30 is moved back and forth along the rails 46 with the cassette in its horizontal position, the holder will be stopped alternately in its two extreme active positions. When the cassette is in its vertical position, the pawl 64 is held in its inoperative position by the spring 80 and the cassette holder is stopped in its mean active position by the stop element 62.

The members 70 and 86 are slidably mounted between a pair of fixed guide rails 90, the movement of the member 86 being limited by a stud 92 which moves in a short slot 94 in one of the guide rails 90. As indicated in Figure 6, the member 86 is pressed toward the right by a spring 96 which permits it to yield a short distance toward the left. When the cassette is inserted in the holder 30 in its horizontal position, the pawl 64 is swung down into operative position, its angular position being substantially as shown in full lines in Figure 9. When the carriage 30 is released, it moves toward its active positions carrying the pawl 64 therewith until the leading apex of the pawl engages the shoulder 84 as shown in Figure 9. Since the pivot point 82 cannot rise, the further progress of the pawl is stopped by the shoulder 84, the blow being cushioned owing to the fact that the member 70 is connected to the dash-pot 72. Thus the cassette holder is stopped in position for the exposure of the area A of the film. The engagement of an apex of the pawl 64 with the shoulder 84 also has the effect of turning the pawl to the position indicated in dotted lines in Figure 9. Thus when the carriage is retracted to its idle position after the exposure of area A of the film, the advancing apex is sufficiently elevated so that it engages the curved cam surface 100 of the member 86 above the notch 102 in this curved surface, as indicated in Figure 10. The final retractive movement of the cassette holder causes the apex of the pawl 64 to ride on the curved surface 100 so that the pawl is turned to the position indicated in dotted lines in Figure 10. This is the same position as is shown in full lines in Figure 7 and the cassette holder is now ready for its second movement into active position. When the holder is released for such movement, the leading apex of the pawl engages a lower shoulder 104 of the member 70 instead of the upper shoulder 84, as indicated in Figure 7. This does not stop the travel of the cassette holder since the pawl merely rotates on its pivot and rides along on the upper surface of the member 70 until the cassette holder is stopped by the engagement of the element 60 with the abutment element 66. The cassette is then in position for exposure of the area B of the film. After such exposure, the holder is again manually retracted to its idle position. During such retractive movement, the pawl 60 slides along the cam surface of the member 70. A portion 106 of this surface adjacent to the shoulder 84 is slightly higher than the horizontal portion 108 and a slight hollow 110 is provided between the surface portions 106 and 108. When the pawl 64 is sliding on the surface 108, two of its apexes are in contact therewith. When the pawl rides over the surface 106, the effect of this elevated surface is to rock the pawl counter-clockwise as indicated in Figure 7, so that, when the pawl leaves the member 70 on its retractive stroke, it is in the angular position indicated in full lines in Figure 8. Thus the advancing apex of the pawl engages the curved cam surface 100 below the notch 102 and thereupon rides into the notch and catches therein, the pawl being instantly rotated to the position indicated in dotted lines in Figure 8 and in full lines in Figure 9. The pawl is now in a position to engage the shoulder 84 when the cassette holder makes its next move from its idle position with the cassette horizontal. At this point the cassette is removed from the holder and reinserted with the areas C and D uppermost. These areas are successively moved into registration with the compression cone projection 40, the holder being automatically stopped in the correct active positions as hereinbefore described. Thus it is evident that the cassette holder will be automatically stopped alternately in its two extreme active positions as long as it is moved back and forth with the cassette in its horizontal position therein.

A spring 120 is provided for moving the cassette holder 30 to its active positions, one end of the spring being anchored to a fixed element within the frame 20, and the other end of the spring being attached to a pin 122 on the cassette holder 30. A latch 124 may be provided to engage a lug 126 on the cassette holder so as to hold the cassette holder in its idle position. This latch may be retracted against a spring 128 by a trigger 130 operated by a handle 132 mounted on the front of the frame 20. The handle 132 is operatively connected to the trigger 130 by a suitable wire or cord 134 or other connecting means. As indicated in Figure 1, a handle 132 may be mounted at each end of the frame 20, either one of these handles being operatively connected to the trigger 130 as desired for the convenience of the operator. After each movement of the cassette holder from its idle position, the holder is manually returned against the spring 120, a convenient handle 136 being provided for this purpose. This handle is on a stem 138 which is secured to the holder and which projects through a slot 139 in the front wall of the frame 20. In order to permit engagement of the latch 124 with the lug 126 when the carriage 30 is retracted, the member 86 is adapted to yield toward the left a short distance against the pressure of the spring 96 when the member 86 is engaged by the shoulder 64 as indicated in Figure 8.

In operating the apparatus, a cassette is placed in the cassette holder when the latter is in its idle position. If a full-sized exposure is desired, the cassette is inserted in its vertical position and the compression cone is moved to its inactive position, thus exposing the full area of the fluorescent screen 26 to the rays. When by inspection it appears that the object to be photographed is in proper position, the handle 132 is rocked to release the holder 30. Since the cassette is in its vertical position in the holder, the stop element 62 is in operative position and engages the abutment element 66 so as to stop the cassette holder in its intermediate active position in which the cassette is properly centered with respect to the fluorescent screen.

As indicated in Figure 6, the holder 30 is provided with a projection 140 which engages an element 142 of a switch so as to hold the switch open. As soon as the holder 30 starts from its idle position, this switch closes at once, thus energizing a solenoid 144 which operates a multiple switch so as to close a number of circuits of the X-ray apparatus, indicated in Figure 6, in a manner well known in the art. The closing of one of these circuits has the effect of stepping up the intensity of X-ray emission for photographic purposes. This involves the heating of a tube filament, requiring an interval of time of the order of a substantial fraction of a second. This is accomplished during the movement of the carriage 30 from its idle position to an active position, so that, when the cassette is in position for exposure, the customary foot switch (not shown) may at once be closed to turn on the X-rays. This speeds up the operation of the mechanism materially by reducing the interval between the visual examination of the object through the fluorescent screen and the photoghaphic exposure of the film.

It is evident that various modifications and changes may be made in the invention herein shown and described without departing from the spirit or scope of the invention as defined in the following claims.

I claim:

1. Apparatus of the class described, comprising a frame having front and rear walls, a fluorescent screen mounted in said front wall, a cassette holder between said walls movable back and forth from an idle position to a point beyond an active position behind said screen, an abutment element carried by said frame, and a stop element carried by said holder and movable relatively thereto into and out of an operative position in which it engages with said abutment to stop said holder when said holder moves from its idle position to its active position, said element having a portion projecting into the interior of said holder engageable by a cassette being inserted into the holder to move said element into its operative position.

2. Apparatus of the class described, comprising a frame having a fluorescent screen, a cassette holder movable in said frame back and forth from an idle position through an intermediate active position to an extreme active position, a fixed abutment on said frame engageable by said holder to stop said holder in said extreme active position, a second abutment on said frame, a stop element carried by said holder and movable relatively thereto from an inoperative position in which it clears said second abutment to an operative position in which it can engage said second abutment to stop said holder in said intermediate active position, and means automatically acting on said stop element when in its operative position to condition said stop element to alternately engage and pass by said second abutment when said holder is repeatedly moved to and from its idle position, said stop element having a portion projecting into the interior of said holder engageable by a cassette being inserted in the holder to move said stop element to its operative position.

3. Apparatus of the class described, comprising a frame having front and rear walls, a fluorescent screen mounted in the front wall, a cassette holder shaped to receive an oblong cassette in either vertical or horizontal position and movable between said walls from an idle position through two intermediate active positions to an extreme active position, means urging said holder toward its active positions, latch means releasably holding said holder in its idle position, means operative only when a cassette is in said holder in vertical position to stop said holder automatically in one of its intermediate active positions, and means operative only when a cassette is in said holder in horizontal position to stop said holder in the other of its intermediate active positions.

4. Apparatus of the class described, comprising a frame having a fluorescent screen, a cassette holder movable in said frame back and forth between an idle position and a plurality of active positions behind said screen, said holder having a square shape with a reentrant corner defining a cassette-receiving space adapted to hold a cassette either in a single vertical position or a single horizontal position, means for automatically stopping said holder in one active position when the holder contains a cassette vertically, and means for stopping said hold in another active position when the holder contains a cassette horizontally.

5. Apparatus of the class described, comprising a frame, a cassette holder movable back and forth in said frame from an idle position to a plurality of active positions, means for stopping said holder whenever it reaches its furthermost active position, and means made operative by the insertion of a cassette into said holder for stopping the holder in an active position nearer to its idle position.

6. Apparatus of the class described, comprising a frame, a cassette holder movable back and forth in said frame from an idle position to a plurality of active positions, means for stopping said holder whenever it reaches its furthermost active position, and means made operative by the insertion of a cassette in the holder to terminate every other movement of the holder from its idle position at an active position nearer to its idle position than said furthermost position.

7. Apparatus of the class described, comprising a frame, a cassette holder movable back and forth in said frame from an idle position to a plurality of active positions, means for stopping said holder whenever it reaches its furthermost active position, and means made operative by the insertion of a cassette in the holder to terminate every other movement of the holder from its idle position to an active position nearer to its idle position than said furthermost position, said last-named means including a pawl pivotally carried by said holder, an abutment member having a shoulder engageable by said pawl when the pawl is in a predetermined angular position to stop said holder, and means engageable by said pawl during back and forth movements of the holder to alter the angular position of the pawl so that it alternately engages and passes by said shoulder.

FRANK SCHOLZ.